United States Patent [19]

Zappa

[11] 4,321,558

[45] Mar. 23, 1982

[54] RECIRCULATING GAS LASER

[75] Inventor: Oswald L. Zappa, Stoneham, Mass.

[73] Assignee: Avco Everett Research Laboratory, Inc., Everett, Mass.

[21] Appl. No.: 129,459

[22] Filed: Mar. 11, 1980

[51] Int. Cl.$^3$ .............................................. H01S 3/22
[52] U.S. Cl. .................................................... 372/58
[58] Field of Search .................. 331/94.5 G, 94.5 PE

[56] References Cited

U.S. PATENT DOCUMENTS

| | | | |
|---|---|---|---|
| 3,543,179 | 11/1970 | Wilson | 331/94.5 G |
| 3,702,973 | 11/1972 | Daugherty | 331/94.5 G |
| 3,721,915 | 3/1973 | Reilly | 331/94.5 PE |
| 3,753,150 | 8/1973 | Zar | 331/94.5 D |
| 3,768,035 | 10/1973 | Zar | 331/94.5 D |
| 3,851,273 | 11/1974 | Hoag | 331/94.5 D |
| 3,886,477 | 5/1975 | Ruby et al. | 331/94.5 G |
| 3,886,481 | 5/1975 | Foster et al. | 331/94.5 T |
| 3,921,098 | 11/1975 | Hoag | 331/94.5 G |

OTHER PUBLICATIONS

Uberoi, "Effect of Wind-Tunnel Contraction on Free-Stream Turbulence", *Journal of the Aeronautical Sciences*, 1956 pp. 754–764.
Norris et al., *General Electric Fluid Flow Data Book*, Dec. 1969, Section 406, pp. 1–13.
Küchemann et al., *Aerodynamics of Propulsion*, McGraw-Hill 1953, pp. 274–278.
Schubauer et al., "Aerodynamic Characteristics of Damping Screens," *National Advisory Committee for Aeronautics*, 1950 Technical Note 2001.
Cornell, "Losses in Flow Normal to Plane Screens," *Transactions of the ASME*, May 1958, pp. 791–799.

*Primary Examiner*—James W. Davie
*Attorney, Agent, or Firm*—Melvin E. Frederick

[57] ABSTRACT

The working parts of a flowing gas laser are enclosed within an airtight housing comprising a first plenum separated from a second plenum. Blower means comprising one or more modules is provided with gas inlet means for receiving gaseous lasing medium from the second plenum and gas outlet means for exhausting the lasing medium to the first plenum. Means defining a lasing region are provided with gas inlet means for receiving lasing medium from the first plenum and gas outlet means for exhausting the lasing medium to the second plenum. The blower means provides a differential pressure across the lasing region sufficient to provide the desired flow of lasing medium through the lasing region. Due to the action of the blower means, lasing medium is caused to circulate from it to and through the lasing region and back to and through the blower means. Heat exchanger means for maintaining the lasing medium at a desired temperature is coupled to a diffuser at the outlet of the lasing region and/or a diffuser at the outlet of the blower means.

10 Claims, 4 Drawing Figures

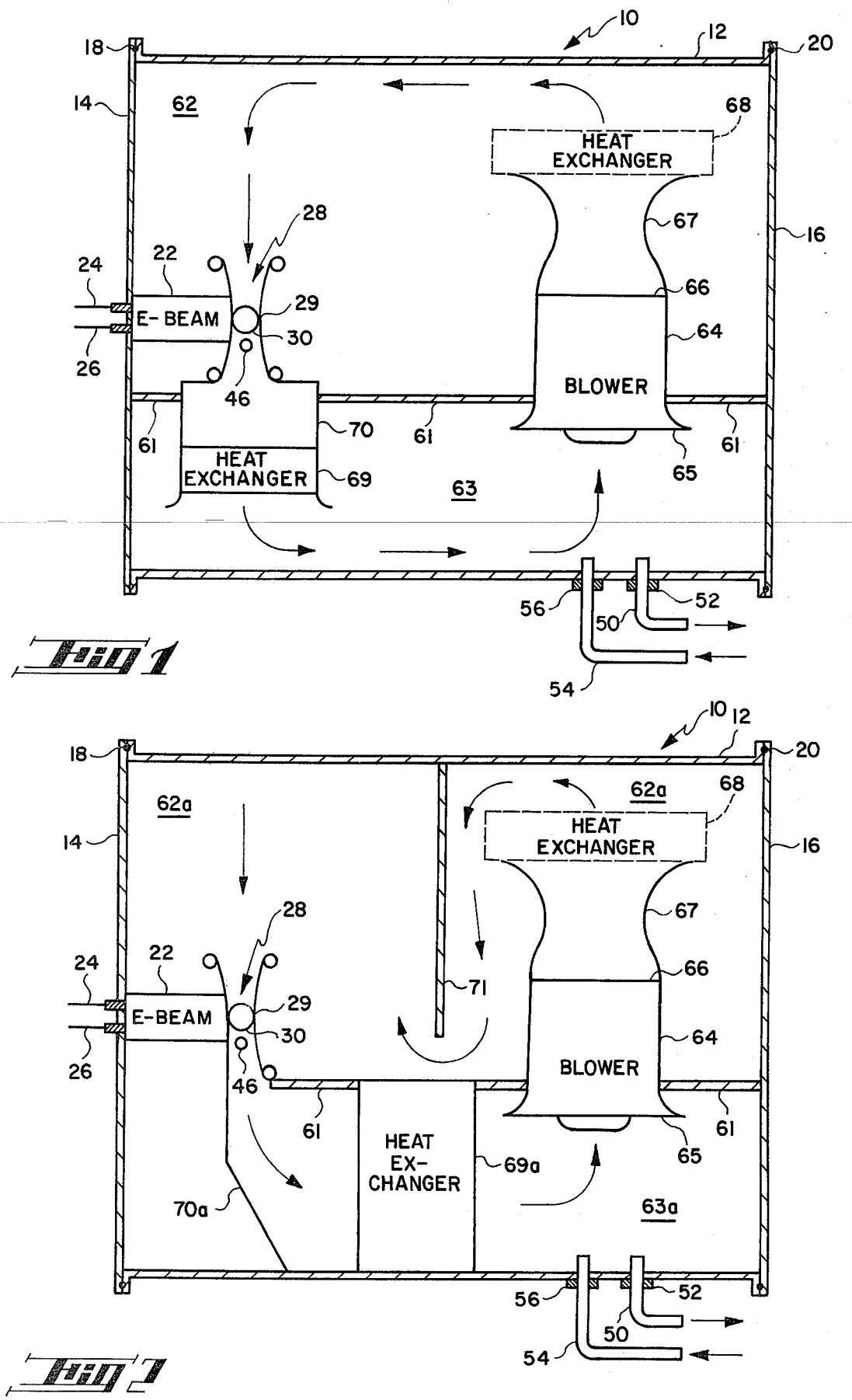

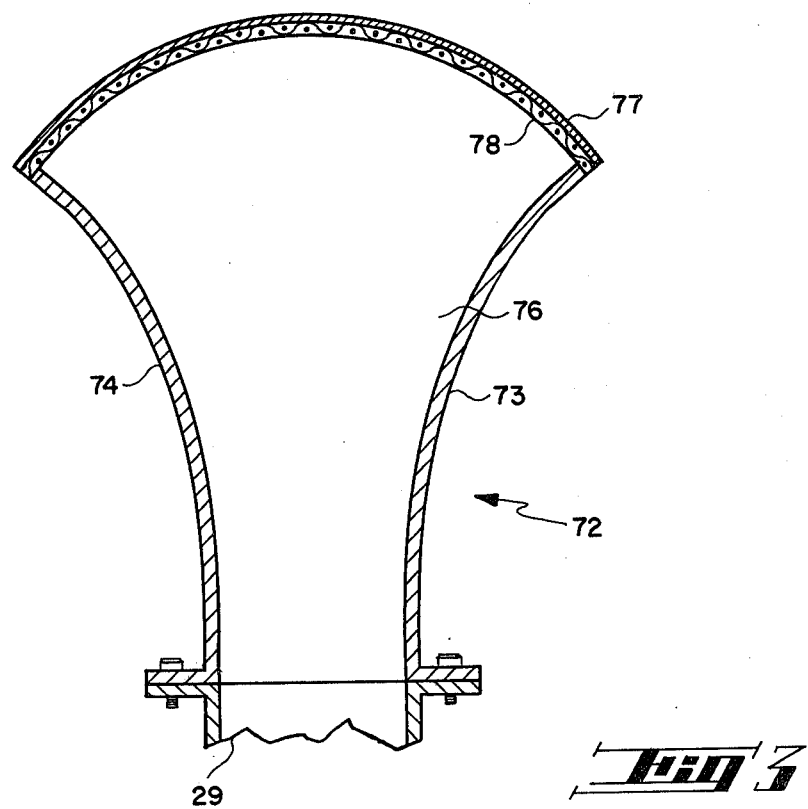
_Fig. 3_
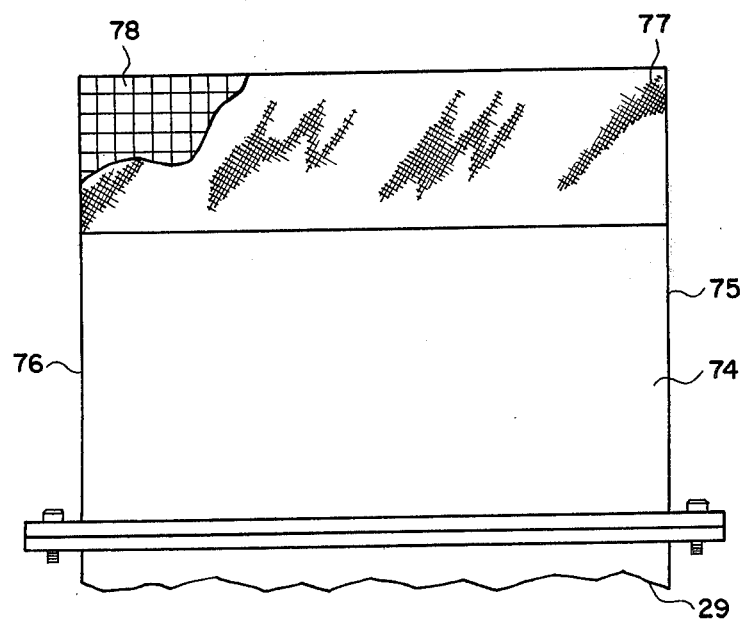
_Fig. 4_

RECIRCULATING GAS LASER

BACKGROUND OF THE INVENTION

This invention relates generally to lasers and more particularly to recirculating gas lasers having an airtight housing in which are disposed the working parts of the laser.

Flowing gas lasers are known in the art. Examples of such lasers are disclosed in the Wilson U.S. Pat. No. 3,543,179; the Daugherty et al U.S. Pat. No. 3,702,973; and the Hoag U.S. Pat. No. 3,921,098. The Daugherty et al and Wilson patents provide an excellent discussion of background laser technology and the Hoag patent provides an excellent discussion of an early form of gas laser, the working parts of which are disposed in a sealed housing. The Wilson, Daugherty et al and Hoag patents are incorporated herein by reference as if set out at length.

One prior art technique requires the construction of the various working parts of flowing gas laser systems to be structurally sound to withstand a high pressure differential. Each part or component must withstand ambient conditions while maintaining a reduced or increased pressure inside the flow area, as well as performing its function in the system. In closed flowing gas lasers, the lasing medium or gas is continuously flowing through the flow path in a circulating fashion. Accordingly, the working parts must act as a guide, as well as withstand the pressure differential between the flow area and the external atmosphere. The respective component parts must be tightly sealed so that extraneous gas leaks will not develop and poison the system, i.e., if oxygen or some other contaminant from the atmosphere leak into the flow region, the system would be contaminated.

Another prior art technique as exemplified by the Hoag patent is based on the provision of an airtight housing to withstand the required pressure differential between the system and the atmosphere. The working components of the laser are mounted within the housing in combination with duct means surrounding the central portion of the housing to define a wind tunnel in which gas flowing in the wind tunnel can, in part, escape into the housing. This wind tunnel approach requires turning sections, transition from circular to rectangular sections, and diffusers with consequent high cost and difficulty of fabrication, high pressure losses and turbulence in the gas flow as it enters the lasing region and/or blowers.

Accordingly, it is an object of this invention to provide an airtight laser housing in which all of the working parts of the laser are mounted within one pressurized container.

Another object of this invention is to provide an airtight laser housing for a flowing gas laser wherein the housing may be easily maintained at reduced pressures and wind tunnel type gas directing means are not required.

A still further object of this invention is to provide an airtight laser housing containing the working parts of the laser wherein the housing is sealed from the external atmosphere and the lasing medium is caused to circulate within the housing with minimum pressure losses and minimum turbulence as the lasing medium enters the lasing region.

SUMMARY OF THE INVENTION

This invention provides an airtight laser housing for a recirculating flowing gas laser. The housing is constructed of suitable material to withstand the required pressure differential between the system and the surrounding atmosphere. The working components or parts of the laser flow system are mounted within the housing. Due to the action of blower means, the lasing medium is caused to flow from one plenum through the lasing means to another plenum and back to the blower means. The lasing medium can flow into and out of the two plenums only through the lasing region and blower means.

Other objects, details, uses and advantages of this invention will become apparent as the following description of the exemplary embodiments thereof presented in the accompanying drawings proceeds.

BRIEF DESCRIPTION OF THE DRAWINGS

FIG. 1 is a side elevational view of an exemplary embodiment of the airtight laser housing in accordance with this invention with one side wall removed;

FIG. 2 is a side elevational view of another exemplary embodiment of this invention;

FIG. 3 is a fragmentary view in cross section showing an improved inlet coupled to the means defining the lasing region; and FIG. 4 is a side elevational view with parts broken away of the inlet of FIG. 3.

DESCRIPTION OF ILLUSTRATED EMBODIMENT

Reference is now made to FIG. 1 of the drawings which illustrates one exemplary embodiment of the improved airtight laser of this invention. The housing 10 is comprised of an outer housing 12 and front and rear doors 14 and 16, respectively, closing the ends of the outer housing 12 to define an enclosed chamber or housing 10. Suitable seals 18 and 20 cooperate respectively between the doors 14 and 16 and the housing 12. Suitable means (not shown) may be provided for removing the respective doors from the housing 12. As an example, the doors may be supported and carried by a suitable gantry structure.

The housing 12 and doors 14 and 16 are constructed of suitable strength material to withstand the pressure differential of the laser system. Steel plate is an example of such suitable material since the housing 12 may, for example, be evacuated to 0.1 atmosphere during operation.

While it is to be understood that the invention is not so limited and is applicable to all recirculating flowing gas lasers, for purposes of convenience, the invention will be described by way of example in connection with the Daugherty et al electron beam-sustainer type laser.

In the illustrative embodiment shown in FIG. 1, an ionizer or electron beam generator 22 is mounted within the space defined by the housing 12 and doors 14 and 16. The electron beam generator 22 may be a generator of the type disclosed in the aforementioned Daugherty et al patent so the operation thereof need not be repeated herein in detail. Leads 24 and 26 connect the electron beam generator 22 with a suitable high voltage supply (not shown). Suitable gasket or seal fittings cooperate between the leads and the housing to insure a gas tight seal.

An optical cavity, designated generally as 28, is defined by spaced mirror elements of which is shown one mirror 30. The planes of the mirror are normal to the direction of gas flow therethrough. One of the mirror elements is completely reflective and the other may be partially reflective and partially transmissive, or alternately divided into two parts comprising a feedback center portion to permit lasing action to occur surrounded by an outer annular portion for reflecting a portion of the beam out of the optical cavity. The term "cavity" as used herein means not only one that is defined by walls, but also one that is not defined by walls or the like since in certain cases, such are not essential to carrying out and/or using this invention. The spaced mirror elements are supported within the housing 12 by any suitable conventional support structure or optical bench (not shown). The electron beam generator 22 is mounted on door 14 or by suitable support structure (not shown) to be in close proximity to the optical cavity 28 as shown.

Conventional sustainer means (not shown) are carried within the optical cavity 28, and are in communication with the electron beam generator 22. Suitable sustainer electrodes and supportive structure (not shown) of the sustainer means are suitably supported within the optical cavity 28. The sustainer electrodes are connected by leads to a suitable high voltage supply (not shown). Suitable seals cooperate between the leads and housing 12 to insure a gas tight seal. The detailed operation of an exemplary electron beam generator 22, sustainer means and optical cavity to produce a laser output are described in detail in the aforementioned Daugherty et al patent, as well as U.S. Pat. No. 3,721,915 issued Mar. 20, 1973 to James P. Reilly, and the disclosure of which is incorporated herein by reference as though set out at length herein. Suffice it to say herein that a gaseous lasing medium such as argon, xenon, krypton or mixtures of $CO_2$, $N_2$, He or H as more fully described hereinafter, is caused to flow through the optical cavity at a desired pressure and appropriate velocity. The lasing medium is excited to a lasing state and lasing action is produced in the lasing region 29 which includes the optical cavity and sustainer electrodes. The lasing medium is so excited by the electrical discharge provided by the cooperation between the electron beam generator 22 and the application of the necessary voltage across the sustainer electrodes of the sustainer means. The lasing medium thus optically excited generates a laser mode or laser action in the lasing region.

In the case of an amplifier device as distinguished from an oscillator device as described herein by way of example, an optical cavity is not, of course, necessary and an externally generated laser beam is introduced into the lasing region and amplified therein.

The reflective mirrors may be positioned so as to direct the laser output to an aerodynamic laser window 46 as shown in FIG. 1. An exemplary apparatus for positioning the laser mirrors is described in Jacob L. Zar U.S. Pat. No. 3,753,150 issued Aug. 14, 1973 entitled "Laser Mirror Positioning Apparatus" and assigned to the assignee of the present application and the disclosure of which is incorporated herein by reference as though set out at length herein. The aerodynamic window 46 is properly designed so as to maintain a reduced pressure within the housing 12. Examples of such aerodynamic window and the operation of such are described in Hoag et al U.S. Pat. No 3,851,273 and Jacob L. Zar U.S. Pat. No. 3,768,035 and need not be described herein for an understanding of the present invention. The Hoag et al and Zar patents identified immediately above are incorporated herein by reference as though set out at length herein.

The housing 12 is connected by a suitable conduit or pipe 50 to an evacuation pump (not shown) which evacuates or pressurizes the housing 10 when activated. The conduit 50 is secured to the housing 12 at one end by a suitable vacuum seal or fitting 52. The laser gas is supplied from a laser gas supply (not shown) via a suitable conduit or pipe 54. A suitable gas seal or fitting 56 provides the required seal in the housing. In addition, suitable coolant and electrical fittings where necessary are provided in the housing 12.

In a flowing gas laser of the type described herein, extremely high output power levels are possible and thus a rapid flow of lasing medium is necessary to remove the waste heat from the lasing region and optical cavity. This waste heat deposited in the lasing medium must then be removed from the lasing medium by means of a heat exchanger. The lasing medium as previously noted is recirculated through the lasing region and optical cavity by suitable blower means.

Broadly, the preceding may be accomplished in accordance with the invention as illustrated in FIG. 1 by the provision of an imperforate wall 61 sealably separating the interior of housing 10 into a first plenum 62 and a second plenum 63. Spaced from the optical cavity 28 is blower means 64. The blower means may be of any commercially available type such as axial-flow compressors having desired operating characteristics. A plurality of separate blowers may be provided to obtain where necessary the desired flow of gas passing therethrough and consequently provide a desired pressure differential across the lasing region 29. The blowers may, for example, in any conventional and suitable manner be supported from the housing with the imperforate wall 61 sealably in contact therewith as with means defining the lasing region 29 to force all flow of the lasing medium adjacent the blowers to flow through the blowers. Accordingly, the gas inlet portion 65 of the blowers is in communication with the second plenum 63. Coupled to the outlet portion 66 of the blower is a diffuser 67. Conventional heat exchanger means 68 may be coupled to the outlet of the diffuser 67 as shown in FIG. 1 whereby lasing medium exiting from the blowers is cooled to a desired operating temperature whereby excess heat and/or heat deposited in the lasing medium by the action of the blowers is removed. In some cases, the blowers have been found to raise the temperature of lasing medium flowing therethrough by 20° F. or more. Heat exchanger means 69 may also be coupled as through a diffuser 70 to the outlet of the lasing region 29. The coupling of the heat exchangers at the outlet of the blowers and/or lasing region to exhaust the lasing medium into the appropriate plenum is important in that this results in minimum flow losses since this results in a reduction in gas velocity at the point at which a turn is required. It also results in loading of the upstream diffuser thereby insuring stable attached flow. The diffusers 67 and 70 are provided to direct all of the flow to respectively heat exchangers 68 and 69.

Attention is now directed to FIG. 2 which shows a modified form of that shown in FIG. 1. As shown in FIG. 2, the outlet of the lasing region 29 is coupled to a diffuser 70a which effects a turning action on the lasing medium exiting from the lasing region. Heat exchanger 69a is coupled to the outlet of diffuser 70a and exhausts into plenum or region 63a which, while comprising a substantial volume, may be smaller than that of FIG. 1. Region 63a of FIG. 2, as is the case with region 63 of FIG. 1, functions as a plenum thereby greatly simplifying and improving flow to the inlet of the blowers.

The gas inlet portion 65 of blower 64 is in communication with plenum 63a as is also the outlet portion of the lasing region 29. As in FIG. 1, heat exchanger means 68 is provided at the outlet of diffuser 67. The outlet portion 66 of blower 64 is in communication with plenum 62a as is the inlet portion of the lasing region. The lasing region inlet portion and the blower outlet portion are spaced one from another and the plenums 62–63 and 62a–63a are of such a volume to provide a lasing medium residence time in the plenums to provide a low level of turbulence in exiting lasing medium as compared to that of lasing medium entering the plenums and especially the lasing medium entering plenums 62 and 62a. Further, porous baffles or curtains may be provided in the plenums as suggested by baffle 71. Such baffles and curtains are effective to reduce the scale of turbulence in plenum 62a and thereby provide a less turbulent gas flow to the inlet of the lasing region.

The reduction of turbulence in lasing medium entering the lasing region 29 has been found to be particularly advantageous in that such reduction in accordance with the invention is believed to have not only substantially improved beam quality, but a reduction in arcing in the lasing region as well as a reduction in manufacturing costs.

Turbulence in lasing medium entering the lasing region may be reduced to a minimum by the provision of an inlet member coupled to the inlet of the lasing region effective to further smooth the flow of laser medium entering the lasing region whereby its flow upon entering the lasing region 29 is substantially laminar in nature.

One means for accomplishing this result is shown in FIGS. 3 and 4. FIG. 3 is a fragmentary sectional end view showing in detail a lasing region inlet member 72 coupled to the means defining the lasing region 29.

The inlet member 72 as illustrated in FIGS. 3 and 4 has been found to be especially effective in improving performance as noted above.

While inlet members in accordance with the present invention are not limited to that shown and described herein and may take other desired forms and shapes, for convenience and simplicity, it will be described in connection with providing laminar flow for a lasing region having an inlet of rectangular cross section.

As shown in FIGS. 3 and 4, the inlet member 72 includes two generally converging side walls 73 and 74 and two end walls 75 and 76. The side walls converge in the direction of gas flow to mate with the side walls defining the lasing region 29. End walls 75 and 76 for this case are flat and mate with the end walls, if any, defining the lasing region 29. Converging side walls 73 and 74 define and direct a converging, generally laminar, flow of gas having corresponding converging streamlines therein. These streamlines in turn define the shape of flow equipotential surfaces which are substantially normal to the streamlines. As used herein, a streamline is a path in a generally laminar flow which a given flow particle is considered to follow and in such a laminar flow which, at any given point, is normal to a streamline passing through that point.

Covering the upper portion of the inlet member is a fine mesh curved screen member 77 supported by a wide mesh support member 78. The screen and support members lie substantially on an equipotential surface. An inlet member in accordance with the invention is applicable with working regions or downstream regions of substantially any configuration. Thus, by way of example, for one having a rectangular configuration, the width and length dimensions are determined. Given these dimensions, the contour of the side walls (assuming for convenience that the end walls are to be flat and need not conform to the contour of a streamline) are disposed on and follow streamlines calculated in conventional manner. The desired streamline determines the contour of the side walls. Broadly, the walls and cover of the inlet member 72 are selected to provide the characteristics of flow through the inlet member 72 that provides the desired characteristics of flow in the downstream lasing region or the like.

The uppermost dimension or cross section effects the quality of flow. The larger this cross section, the smaller the scale of turbulence will be.

The selection of the wall contours as discussed above determines the equipotential surfaces at various locations along the length of the inlet member. Thus, at any given point, the equipotential surface and streamline at that point are perpendicular. The wall contours are selected to give the maximum upstream inlet area. The contours of the wall are preferably selected to give a cylindrical equipotential surface at the uppermost point. A cylindrical equipotential surface provides the maximum inlet area for the smallest outlet area and, hence, minimum turbulence. For the above reasons, the screen member 77 preferably defines such a cylindrical equipotential surface. However, it is to be understood that for different applications, the screen 77 can define elliptical, parabolic or any other desirable surfaces.

The proper contour of walls and cover defining the inlet member are those which provide an increasing gas velocity.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In a recirculating flowing gas laser system, the combination comprising:
   (a) an outer gas tight housing capable of sealably withstanding a substantial pressure differential between the interior of said housing and the external atmosphere, at least a portion of said housing being sealably removable to provide access to the interior of said housing;
   (b) means adapted for connection to a source of lasing medium for introducing a lasing medium into said housing;
   (c) means adapted for connection to pumping means for removing gas from the interior of said housing;
   (d) means defining a lasing region having a gas inlet portion and a gas outlet portion disposed within said housing for producing lasing action in said lasing region;
   (e) means for coupling out of said housing laser energy produced in said lasing region;

(f) blower means having a gas inlet portion and a gas outlet portion disposed within said housing for imparting movement to lasing medium disposed within said housing;

(g) heat exchanger means for removing heat from lasing medium disposed in said housing;

(h) means defining a first plenum within said housing, said lasing region gas inlet portion and said blower means gas outlet portion being in communication one with another through said first plenum; and (i) means defining a second plenum within said housing, said lasing region gas outlet portion and said blower means gas inlet portion being in communication one with another through said second plenum, said lasing medium in said housing being capable of flowing from one plenum to another substantially only through said blower means and said lasing region, at least said first plenum having a volume providing a lasing medium residence time therein sufficient to provide a low level of turbulence in exiting lasing medium as compared to that of entering lasing medium.

2. The combination as set forth in claim 1 wherein said first plenum is of such volume as to provide substantial damping of turbulence in said lasing medium prior to entry into said lasing region gas inlet.

3. The combination as set forth in claim 1 and additionally including diffuser means coupled to the outlet of said blower means, and at least a portion of said heat exchanger means is disposed between the outlet of said diffuser means and said first plenum.

4. The combination as set forth in claim 1 and additionally including diffuser means coupled to the gas outlet of said lasing region, and at least a portion of said heat exchanger means is disposed between the outlet of said diffuser means and said second plenum.

5. The combination as set forth in claim 4 wherein the volume of said first region is greater than that of said second region.

6. The combination as defined in claim 1 wherein said lasing region gas inlet portion comprises generally convergent side walls, the contours of which each define streamlines and a substantially rigid fine mesh screen member covering the upstream end of said gas inlet portion and through which said lasing medium must flow, said screen member being at least substantially disposed on an equipotential surface.

7. The combination as defined in claim 6 wherein the said side walls and screen member are arranged and adapted to provide a substantially continuous increase in velocity of lasing medium flowing through said gas inlet portion.

8. The combination as defined in claim 7 wherein said screen member is at all points substantially perpendicular to streamlines within said gas inlet member.

9. The combination as defined in claim 8 wherein said screen member is cylindrical in shape.

10. The combination as defined in claim 6 wherein the contour of the side walls are selected to provide a cylindrical equipotential surface at the upstream end of said gas inlet portion.

* * * * *